Dec. 20, 1949     O. THORESEN     2,492,020
SCAVENGING SYSTEM FOR AIR PROPELLER GEAR DRIVES
Filed July 26, 1947
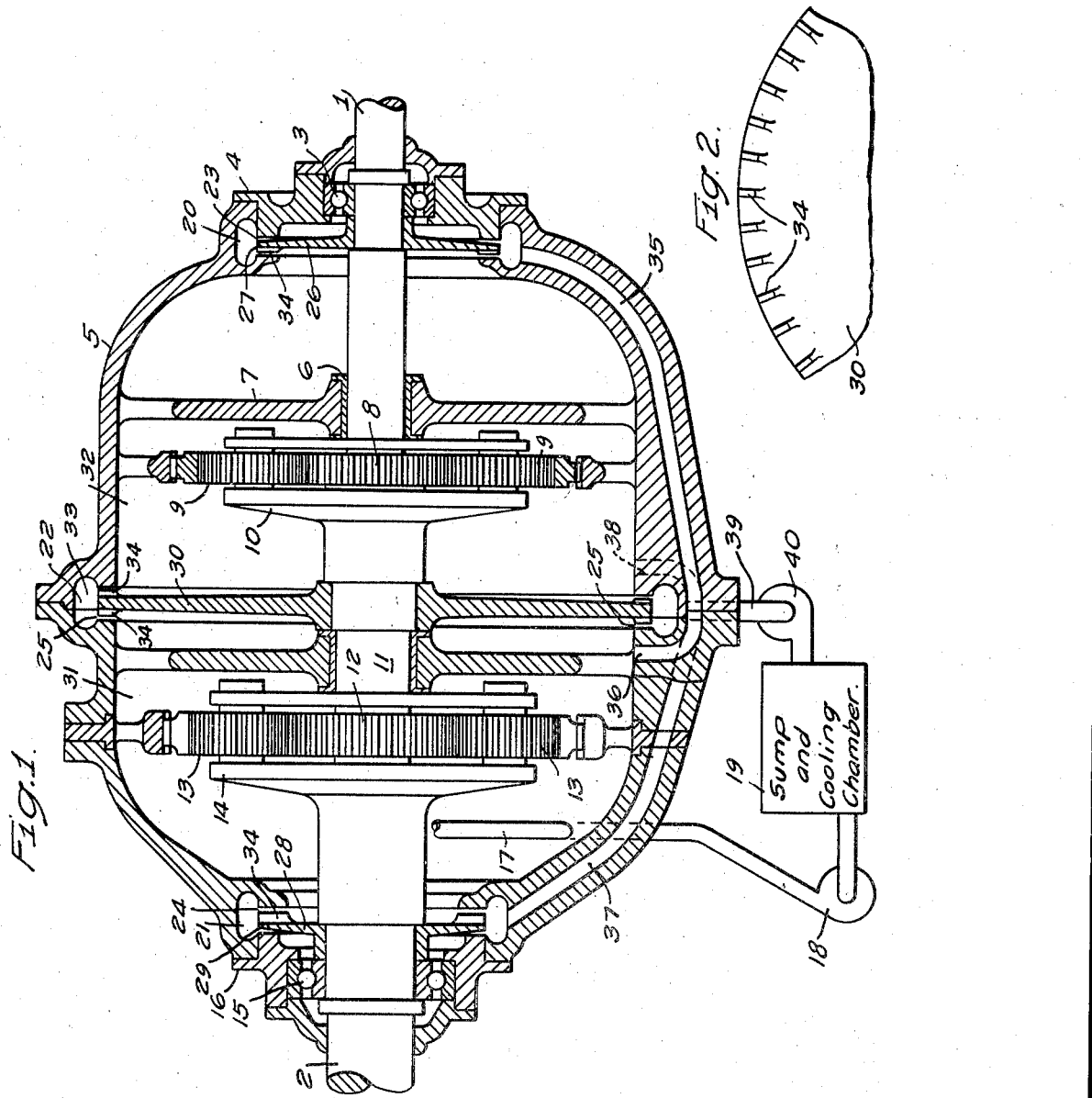
WITNESSES:
INVENTOR
Oscar Thoresen,
BY
Paul E. Friedemann
ATTORNEY Patented Dec. 20, 1949

2,492,020

UNITED STATES PATENT OFFICE 2,492,020

SCAVENGING SYSTEM FOR AIR PROPELLER GEAR DRIVES

Oscar Thoresen, Pittsburgh, Pa., assignor to Westinghouse Electric Corporation, East Pittsburgh, Pa., a corporation of Pennsylvania Application July 26, 1947, Serial No. 763,848

10 Claims. (Cl. 184—6)

This invention relates to transmission gearing for aircraft, and more particularly, to an improved system for scavenging excess lubricant from the housing for the transmission gearing.

Transmission gearing for aircraft must be capable of transmitting a large amount of power from the aircraft engine to the propeller while effecting a very large reduction in the speed ratio of the shaft connected to the engine and the shaft connected to the propeller. The rotating parts of the transmission comprising the gearing and bearings rotate at extremely high speeds and are subjected to extremely high pressures and loads. If excess lubricant is permitted to accumulate in the housing under these conditions, the bearings and gearing will be flooded with lubricant thereby resulting in excessive loads on such parts which will cause overheating. In addition, the excess oil in the transmission housing may be subjected to a violent churning action which will cause overheating and may result in the formation of an oil foam. These problems and undesirable factors have been accentuated by the general trend of modern engine design toward higher speed engines capable of producing greater horsepower, such as the modern jet turbine engines. With such engines, the transmission gearing must be capable of transmitting more horsepower at a greater reduction in speed, thereby resulting in greater loads on the moving parts of the transmission. These factors have increased the desirability of providing an effective system for scavenging the excess lubricant from the housing for the transmission gearing.

One of the principal objects of this invention is to provide an improved system for scavenging lubricant from a housing for transmission gearing or the like which will be effective to remove the lubricant from all parts of the housing.

A further object of this invention is to provide an improved system for scavenging lubricant from a housing containing rotating parts which will be completely effective regardless of the angular inclination of the housing.

A still further object of the invention is to provide a lubricant scavenging system for aircraft transmission gearing which will be effective when the aircraft is in a vertical dive or steep climb as well as when the plane is travelling in a horizontal direction.

A still further object of this invention is to provide a lubricant scavenging system in which excess lubricant collected in the ends of a transmission housing is forceably transferred to the central portion of the housing from which it may be discharged to a reservoir.

Other objects and advantages of the invention will become apparent during the course of the following description.

In the drawing there is shown a preferred embodiment of the invention. In this showing:

Figure 1 is a vertical sectional view of a speed reduction transmission for aircraft provided with a lubricant scavenging system constructed in accordance with the principles of this invention, parts thereof having been broken away and illustrated diagrammatically, and Fig. 2 is a partial view of one of the scavenging rotors employed in the apparatus shown in Fig. 1, illustrating the construction of the impeller blades provided on the scavenging rotors.

In Fig. 1, there is shown a speed reduction transmission for transmitting power from a driven shaft 1 to a driving shaft 2. The transmission illustrated is a type particularly designed for aircraft and the driven shaft 1 will be connected to the aircraft engine and the driving shaft 2 will be connected to the aircraft propeller in accordance with conventional practice. The driven shaft 1 is rotatably mounted by a bearing 3 located at one end 4 of a housing 5 and a journal bearing 6 carried by supporting members 7 mounted within the housing 5. Sun gear 8 driven by the shaft 1 drives a plurality of planet gears 9 mounted on a planetary cage 10 which in turn drives a motion transmitting shaft 11. A second sun gear 12 driven by the motion transmitting shaft 11 drives a plurality of planet gears 13 mounted on a planetary cage 14 which is connected to the driving shaft 2. The driving shaft 2 is rotatably supported by a bearing 15 at the end 16 of the housing 5.

A lubricant supply conduit 17 extends within the housing 5 for delivering lubricant under pressure to the rotating parts at such points where lubricant is needed. Since this invention is not concerned with the parts by which the lubricant is supplied to the various elements of the transmission gearing, such parts have not been illustrated and it is to be understood that the oil supply lines will be supplied in actual practice in a conventional manner. For the purposes of this invention it will be sufficient to point out that lubricant is delivered to the housing 5 by a pump 18 from an oil sump and cooling chamber as indicated at 19, this invention being primarily concerned with the mechanism for scavenging the excess lubricant draining into the housing 5 from the rotating parts therein.

To remove the excess lubricant from the housing 5, the housing is provided with an annular passage 20 at the housing end 4 and a similar annular passage 21 at the housing end 16, together with an annular passage 22 positioned substantially centrally of the housing 5. The annular passages 20, 21 and 22 extend circumferentially of the housing 5 and are provided, respectively, with openings 23, 24 and 25 along their inner peripheral edges in communication with the interior of the housing 5. A rotor 26 is mounted on the driven shaft 1 and has its peripheral edge 27 extending into the opening 23 by which the annular passage 20 communicates with the interior of the housing 5. Similarly, a rotor 28 is mounted on the driving shaft 2 and has its inner peripheral edge 29 extending into the opening 24 by which the annular passage 21 has communication with the interior of the housing 5. A third rotor 30 is mounted on the transmitting shaft 11 and is positioned substantially centrally of the housing 5 thereby dividing such housing into two compartments, 31 and 32, for a purpose to be described. The rotor 30 has its peripheral edge 33 extending into the opening 25 through which the passage 22 communicates with the interior of the housing 5. At this point attention is invited to the fact that the annular passages 20 and 21, respectively, communicate only with the compartments 32 and 31, whereas the passage 22 has communication with both of such compartments. This arrangement of the annular passages with respect to the compartments 31 and 32 is important in connection with scavenging excess lubricant when the aircraft is in a dive or a steep climb. The rotors 26, 28 and 30 are all provided with a plurality of impeller blades 34 adjacent their peripheral edges and arranged in an annular path, as indicated best in Fig. 2. Although the impeller blades 34 are shown as extending radially of the rotors, it is to be understood that the construction may be changed or curved, if desired. Attention is also invited to the fact that the rotors 26 and 28 are provided with impeller blades 34 only on the sides thereof facing inwardly of the housing 5, since the oil to be discharged by such rotors will come only from the compartments with which they are associated. The rotor 30 is provided with impeller blades 34 on both sides thereof since the rotor 30 will function to scavenge oil from both compartments 31 and 32.

The annular passage 20 is in communication with a discharge conduit 35 by which lubricant is delivered from the passage 20 into the compartment 31 through the opening 36 in the housing 5 which is located at a point adjacent the rotor 30. Similarly, the annular passage 21 is in communication with a conduit 37 by which lubricant from the passage 21 is delivered into the compartment 32 through an opening 38 located at a point adjacent the rotor 30. In this manner excess lubricant from one of the compartments 31 or 32 which finds its way into one of the end annular passages 20 or 21 is first delivered to the other compartment before being discharged from the housing 5. The annular passage 22 has communication with an exhaust conduit 39 by which lubricant from the passage 22 is delivered to a pump 40 which will force such lubricant through the cooling chamber in the sump 19 from whence it will be returned by the pump 18 and conduit 17 to the housing 5.

In normal operation the housing 5 will occupy a horizontal position when the aircraft carrying such housing is travelling in a horizontal direction. Under such conditions the lubricant will drain into the housing 5 where it will contact the rotor 30. Since the rotor 30 will be rotating at a high speed, such oil will be moved outwardly by centrifugal force into the passage 22. The impeller blades 34 will assist materially in the centrifugal discharge of such lubricant. In the event that the aircraft goes into a dive, then the rotor 30 will function to remove the oil from the compartment 32 in the manner just described. However, the lubricant in the compartment 31 will drain into engagement with the rotor 28 which will operate to force such oil by centrifugal force into the annular passage 21, the impeller blades 34 on the rotor 30 assisting in this action. The oil in the passage 21 will then be forced through the exhaust conduit 37 and opening 38 into the compartment 32 from which it will be discharged by the scavenging rotor 30, as explained above. Similarly, in the event that the aircraft is climbing, the rotor 30 will effect a direct removal of the oil from the compartment 31 and the rotor 26 will force the oil from the compartment 32 through the exhaust conduit and opening 36 into the compartment 31 from which it will be discharged by the rotor 30.

From the foregoing it will be apparent that the lubricant scavenging system described above is effective to remove excess lubricant from the housing 5, regardless of the angular inclination of the housing 5. Attention is particularly invited to the fact that the lubricant is scavenged from the housing 5 centrally thereof by the rotor 30. Attention is also invited to the fact that excess lubricant in the ends of the housing 5 is effectively removed by the rotors 26 and 28 through the passages 20 and 21. Although the oil collected from the ends of the housing 5 in the passages 20 and 21 is first delivered to the compartment at the opposite end of the housing 5 before being discharged therefrom, it is to be understood that the oil collected from the ends of the housing 5 may be discharged directly from the housing, if so desired, without departing from the principles of this invention.

Since numerous changes may be made in the above-described construction and different embodiments of the invention may be made without departing from the spirit and scope thereof, it is intended that all matter contained in the foregoing description or shown in the accompanying drawing shall be considered as illustrative and not in a limiting sense.

I claim as my invention:

1. A lubricant scavenging system comprising a housing having rotating mechanism therein and a forced feed lubricant supply for lubricating said mechanism, said housing having three annular passages extending circumferentially thereof one at each end of the housing and one centrally thereof and having their inner peripheral edges in communication with the interior of said housing, three rotors mounted in said housing and respectively having their peripheral edges positioned adjacent the open inner edge of one of said passages, each of said rotors having a plurality of impeller blades arranged in an annular path adjacent its peripheral edge, said blades being operative to receive the lubricant draining from said mechanism into said housing and to centrifugally force such lubricant into said passages, the rotor associated with the centrally positioned annular passage dividing said housing into two compartments, exhaust conduits in communication with said passages at each end of said housing connecting said passages respectively with the compartment on the remote side of the rotor associated with said centrally positioned annular passage and an exhaust conduit communicating with said centrally positioned annular passage.

2. A lubricant scavenging system comprising a housing having rotating mechanism therein and a forced feed lubricant supply for lubricating said mechanism, said housing having at its ends and central portion respectively an annular passage extending circumferentially thereof, said annular passages having their inner peripheral edges open and in communication with the interior of said housing, a plurality of rotors mounted in said housing, each of said passages being provided with one of said rotors, each of said rotors having its peripheral edge positioned adjacent the open inner edge of one of said passages and being operative to centrifugally force lubricant draining from said mechanism into its adjacent passage, and exhaust conduits in communication with said passages.

3. A lubricant scavenging system comprising a housing having rotating mechanism therein and a forced feed lubricant supply for lubricating said mechanism, said housing having at its ends and central portion respectively an annular passage extending circumferentially thereof, said annular passages having their inner peripheral edges open and in communication with the interior of said housing, a plurality of rotors mounted in said housing, each of said passages being provided with one of said rotors, each of said rotors having its peripheral edge positioned adjacent the open inner edge of one of said passages and having a plurality of impeller blades arranged in an annular path adjacent its peripheral edge, said blades being operative to receive the lubricant draining from said mechanism into said housing and to centrifugally force such lubricant into said passages, and exhaust conduits in communication with said passages.

4. A lubricant scavenging system comprising a housing having rotating mechanism therein and a forced feed lubricant supply for lubricating said mechanism, said housing having at its ends and central portion respectively an annular passage extending circumferentially thereof, said annular passages having their inner peripheral edges open and in communication with the interior of said housing, a plurality of rotors mounted in said housing, each of said passages being provided with one of said rotors, each of said rotors having its peripheral edge positioned adjacent the open inner edge of one of said passages, the rotor provided for the annular passage at the central portion of said housing operating to divide said housing into two compartments, each of said rotors being operative to centrifugally force the lubricant draining into said housing from said mechanism into its adjacent passage, and exhaust conduits in communication with said passages.

5. A lubricant scavenging system comprising a housing having rotating mechanism therein and a forced feed lubricant supply for lubricating said mechanism, said housing having at its ends and central portion respectively an annular passage extending circumferentially thereof, said annular passages having their inner peripheral edges open and in communication with the interior of said housing, a plurality of rotors mounted in said housing, each of said passages being provided with one of said rotors, each of said rotors having its peripheral edge positioned adjacent the open inner edge of one of said passages, the rotor provided for the annular passage at the central portion of said housing operating to divide said housing into two compartments, each of said rotors being operative to centrifugally force the lubricant draining into said housing from said mechanism into its adjacent passage, each of said compartments having one of said passages located at the ends of said housing positioned therein, each of the end passages in one of said compartments having an exhaust conduit for transferring lubricant therefrom to said other compartment, and an exhaust conduit in communication with the passage located centrally of said housing for scavenging excess lubricant from said housing.

6. A lubricant scavenging system comprising a housing having rotating mechanism therein and a forced feed lubricant supply for lubricating said mechanism, said housing having an annular passage extending circumferentially thereof at a point intermediate its ends, said housing having a second annular passage extending circumferentially thereof at one of said ends, each of said passages having its inner peripheral edge open and in communication with the interior of said housing, a plurality of rotors mounted in said housing and respectively having their peripheral edges positioned adjacent the open inner edge of one of said passages so that each passage is provided with one of said rotors, the rotor provided for said first named annular passage operating to divide said housing into two compartments at opposite sides thereof, each of said rotors operating to centrifugally force lubricant draining from said mechanism into its associated passage, said second named passage having communication with one of said compartments having an exhaust conduit for transferring lubricant to the other of said compartments, and an exhaust conduit in communication with said first named passage for scavenging excess lubricant from said housing.

7. In a lubricant scavenging system, a housing having rotating mechanism therein and a forced feed lubricant supply for lubricating said mechanism, said housing having a plurality of exhaust conduits respectively opening into the interior of said housing at its ends and central portion, and means for forcing the lubricant draining from said mechanism into said conduits, each exhaust conduit opening into an end of said housing operating to transfer the lubricant collected in such end of the housing to the interior of said housing at a point intermediate said central conduit exhaust opening and the other end of said housing, said exhaust conduit opening into the central portion of said housing being operative to scavenge the excess lubricant from said housing.

8. In a lubricant scavenging system, a housing having rotating mechanism therein and a forced feed lubricant supply for lubricating said mechanism, said housing having a partitioning member dividing it into two compartments, each of said compartments having a transferring exhaust conduit opening into the interior of said housing at an end of said housing, said housing having a scavenging exhaust conduit opening into both of said compartments adjacent the center of said housing, means for forcing lubricant draining from said mechanism into said conduits, each of said transferring conduits operating to transfer lubricant collected at its said opening from the compartment in which it is located to the other compartment at a point adjacent said partitioning member, said scavenging conduit operating to remove the lubricant from both of said compartments.

9. In high speed transmission gearing, a housing, transmission gearing mounted in said housing, lubricant supply means for lubricating said gearing, and means for scavenging the excess lubricant draining from said gearing into said housing comprising a plurality of exhaust conduits respectively opening into and communicating with the interior of said housing at points adjacent its ends and central portion, and means for forcing the lubricant from said housing into said conduits, each exhaust conduit opening into an end of said housing operating to transfer the lubricant collected in such end of the housing to the interior of said housing at a point intermediate said central exhaust conduit opening and its other end, said exhaust conduit opening into the central portion of said housing being operative to scavenge the excess lubricant from said housing, the overall arrangement of said exhaust conduits being effective to scavenge the oil from said housing regardless of its angular inclination.

10. In high speed transmission gearing, a housing, transmission gearing mounted in said housing, lubricant supply means for lubricating said gearing, and means for scavenging the excess lubricant draining from said gearing into said housing comprising a plurality of annular passages extending circumferentially of said rotor respectively located at points adjacent the ends of and central portion of said housing, said annular passages having their inner peripheral edges open and in communication with the interior of said housing, a plurality of rotors mounted in said housing, each of said passages being provided with one of said rotors, each of said rotors having its peripheral edge positioned adjacent the inner edge of one of said passages and being operative to centrifugally force lubricant draining from said mechanism into its adjacent passage, and exhaust conduits in communication with said passages.

OSCAR THORESEN.

REFERENCES CITED

The following references are of record in the file of this patent:

UNITED STATES PATENTS

| Number | Name | Date |
|---|---|---|
| 1,657,349 | Eisenhaver | Jan. 24, 1928 |
| 2,234,777 | Puffer | Mar. 11, 1941 |
| 2,302,822 | Warner | Nov. 24, 1942 |
| 2,406,388 | Larrecq | Aug. 27, 1946 |

FOREIGN PATENTS

| Number | Country | Date |
|---|---|---|
| 442,612 | Germany | Apr. 4, 1927 |